F. P. IANNARONE.
EYE-GLASSES.

No. 186,573. Patented Jan. 23, 1877.

Witnesses
John Tyler
Jno. J. Bonner

F. P. Iannarone, Inventor.
By Attorney

UNITED STATES PATENT OFFICE.

FRANK P. IANNARONE, OF WASHINGTON, DISTRICT OF COLUMBIA.

IMPROVEMENT IN EYEGLASSES.

Specification forming part of Letters Patent No. 186,573, dated January 23, 1877; application filed December 6, 1876.

*To all whom it may concern:*

Be it known that I, FRANK P. IANNARONE, of Washington, in the District of Columbia, have invented certain new and useful Improvements in Eyeglasses; and I do hereby declare that the following is a full and exact description thereof, reference being had to the accompanying drawings, making a part of this specification.

My invention relates to novel improvements in eyeglasses. It has for its object to provide a soft, self-adjusting clamp, to sustain the glasses upon the nose; and consists of a pair of soft-rubber clamps connected with the frame, or otherwise to the inside of each glass, and adapted to swivel in transverse directions, in order that they may accommodate themselves to the vertical and horizontal planes of the nose, as will be hereinafter more fully set forth.

Previous to my invention the nose-clamps of eyeglasses have been made of metal or other hard substance, and have had but one swiveling movement. The pressure of any hard substance upon the nose is exceedingly disagreeable, and the adaptability of the clamps to a single movement, to accommodate themselves to the vertical planes of the nose, renders it difficult to keep the glasses properly adjusted with reference to focal lines. Any horizontal movement of the glasses induced by the movement of the head effects a displacement of the clamps, and the release, finally, of the glasses or false adjustment with reference to focal lines. Another disadvantage incident to the ordinary construction is due to the fact that when the glasses pass each other in being closed and hooked together, in opening, the clamps catch against each other, and interfere with free passage of the glasses.

By my invention all these difficulties are overcome, and quick and ready adjustment and comfort secured, as will be hereinafter more fully described.

In order that those skilled in the manufacture and use of glasses may understand my invention, I will proceed to describe the same more in detail, referring by letters to the accompanying drawing, in which—

Figure 1:
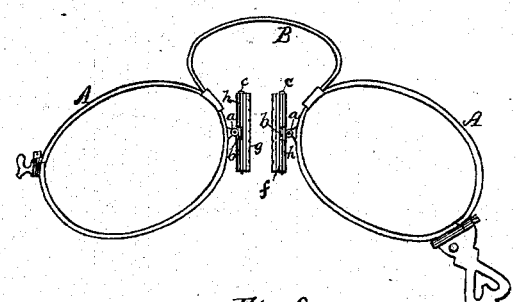
Figure 2:
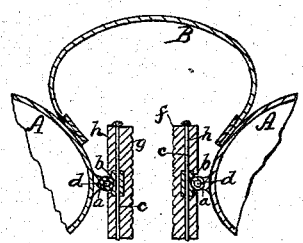
Figure 3:
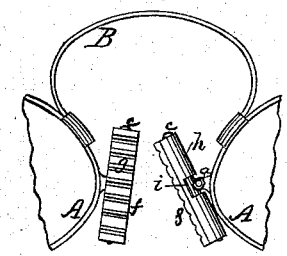

Figure 1 is a plan view of a pair of framed eyeglasses provided with my improved clamps. Fig. 2 is a vertical section of the same upon a slightly-enlarged scale, with the glasses broken away; and Fig. 3 is a plan view, similar to Fig. 1, slightly enlarged, and showing one of clamps swiveled to accommodate it to the vertical plane of the nose, and the other one swiveled transversely to accommodate it to the horizontal plane of the nose.

Similar letters of reference indicate like parts in the several figures.

A A represent the frames inclosing the glasses, and B the ordinary nose-spring, secured in the usual manner to the frames. $a$ $a$ are projections from the inside edge of each glass-frame, forming each a half-hinge, and adapted to receive a hinge portion or T joint, $b$, adapted to receive a vertical pin or bar, $c$, which portion $b$ is confined within the hinge $a$ by a suitable rivet or screw-pintle, $d$. From this construction it will be seen that the pin or bar $c$, passing through the portion $b$, may vibrate or rock upon the pintle $d$, out of a perpendicular line into any line parallel with the vertical plane of the nose. So far as this movement is concerned, I do not claim any advance in the state of the art; but to acquire the other necessary movement of the clamps to accommodate themselves to the horizontal plane or sides of the nose. I provide a soft-rubber pad or cushion, $f$, with a flat or corrugated face, $g$, to bear against the nose, and having a vertical hollow rib, $h$, on its back, adapted to allow the passage of the pin or bar $c$. This hollow rib $h$ is cut away at about the center, as seen at $i$, Fig. 3, most clearly, to permit the introduction of the T portion $b$ of the hinge into line with the central hole or bore of the rib $h$, so that when the pin $c$ is introduced and forced through the rib it will pass also through the T portion $b$, and thus effect the connection between all the parts. The pad or cushion $f$, it will be readily seen, may freely move or swivel horizontally upon the pin $c$, and readily and automatically accommodate itself to the horizontal plane of the nose.

It will be observed that by the construction of the parts as I have shown them they may be very readily secured in position, or separated when it may be desirable to substitute new cushions or other parts of the structure forming the entirety of the double adjustable clamp. It will also be observed that as the glasses pass each other when being hooked together or released, the clamps, coming in contact with each other, turn upon the pins $c$, and out of the way of each other, and will not catch or hang, as in the ordinary nose-clamps.

I do not wish to confine myself to the exact features of construction, as they may be varied without departing from the spirit of my invention. For instance, the pin $c$ and T-shaped portion $b$ might be made in one piece or rigidly secured together, and the rubber cushion split longitudinally in the back of the rib and sprung into place; or the rubber cushion might be backed with a metal rib, split, and secured in position by rivets or otherwise. Nor do I wish to confine myself, so far as the double self-adjustment is concerned, to the employment of a soft-rubber cushion, as it is obvious that in so far as the adjustment is concerned, it would be equally as well effected with a hard metal or rubber clamp as with the soft-rubber cushion. Nor do I wish to confine myself to the employment or combination of my double self-adjusting clamps with glasses having metal or other frames, as they may be used equally as well with glasses having no surrounding frame, as will be readily understood by reference to an application filed by me simultaneously with this, and relating more particularly to the manner of connection between the nose-spring and glasses; but, Having described the construction and advantages of my invention, what I claim as new, and desire to secure by Letters Patent, is—

1. Eyeglasses provided with nose-clamps having two adjustments, each independent of the other—one produced by the vibration of the metal hinge, and the other by the rotation of the pad and vertical pin, substantially as hereinbefore set forth.

2. The combination of hinged portions $d\ b$, rubber cushion $f$, and removable pin $c$, substantially as and for the purpose set forth.

3. A nose cushion or pad for eyeglasses, having one side adapted to lie against the nose, and the opposite side formed with a rib having a central bore to receive a securing-pin, substantially as herein set forth.

Witness my hand and seal this 1st day of December, A. D. 1876.

F. P. IANNARONE. [L. S.]

Witnesses:
 JNO. J. BONNER,
 FRANK PHILLIPS.